(12) United States Patent
Zumberge

(10) Patent No.: US 7,374,254 B2  
(45) Date of Patent: May 20, 2008

(54) ELECTRIC CALIPER POSITION CONTROL WITH ADAPTIVE ESTIMATION

(75) Inventor: Jon T. Zumberge, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 55 days.

(21) Appl. No.: 11/294,179

(22) Filed: Dec. 5, 2005

(65) Prior Publication Data

US 2007/0126281 A1 Jun. 7, 2007

(51) Int. Cl.
*B60T 8/66* (2006.01)
*F16D 66/00* (2006.01)

(52) U.S. Cl. .................... 303/162; 188/1.11 E
(58) Field of Classification Search ........... 303/162, 303/126, 154, 155, 112, 20, DIG. 3; 188/1.11 E, 188/71.8, 71.9, 72.1, 72.8
See application file for complete search history.

(56) References Cited

U.S. PATENT DOCUMENTS 4,995,483 A * 2/1991 Moseley et al. ........... 188/162
6,279,694 B1 * 8/2001 Bohm et al. ............... 188/162
6,454,365 B1 * 9/2002 Arwine et al. ............. 303/155
6,535,808 B1 * 3/2003 Zumberge ................... 701/73
6,554,108 B1 * 4/2003 Bohm .................... 188/1.11 E
6,969,126 B2 * 11/2005 Ichinose et al. ............ 303/11
2006/0273658 A1 * 12/2006 Halassy-Wimmer et al. ..... 303/191

FOREIGN PATENT DOCUMENTS

WO    WO 2004101338 A1 * 11/2004

* cited by examiner

*Primary Examiner*—Xuan Lan Nguyen
(74) *Attorney, Agent, or Firm*—Scott A. McBain (57) ABSTRACT

A method for controlling an electric brake system having a piston moveable by an electric motor is provided. The method includes the steps of storing data for correlating a position of the piston to a braking force applied by the piston, estimating a braking force associated with a specific position of the piston based upon the stored data, generating a control signal based upon the estimated braking force, determining a second braking force associated with the specific position and updating the stored data based upon a difference between the estimated braking force and the second braking force.

20 Claims, 6 Drawing Sheets

ELECTRIC CALIPER POSITION CONTROL WITH ADAPTIVE ESTIMATION

"This invention was made with Government support under Agreement F33615-03-3-2308 awarded by the Air Force Research Laboratory—Wright Patterson AFB, Ohio. The Government has certain rights in the invention."

The subject matter described herein was created during the performance of a cooperative research and development agreement with the Department of the Air Force (Contract No. F33615-03-2308 P00002). Therefore, the government of the United States may have certain rights to the claimed subject matter.

BACKGROUND

The present application is directed to control systems and, more particularly, to adaptive control systems for electric brake systems and the like.

Electric brake systems have been developed for use in the automotive, aerospace and aeronautical industries to control the speed, stability and operation of various vehicles and devices. Electric brake systems, commonly referred to as brake-by-wire systems, have be used in combination with, or in place of, conventional hydraulic brake systems.

A typical electric brake system includes an electric motor adapted to advance a piston into engagement with brake pads and/or a rotor, thereby generating a braking force. The amount of braking force generated typically is a function of the distal advancement of the piston. Therefore, the braking force may be controlled by controlling the operation of the electric motor.

The braking force applied by an electric brake system typically is controlled by monitoring the force exerted by the piston and/or the position of the piston and controlling the electric motor based upon the force and/or position signals to achieve the desired braking result. The force may be monitored directly using force gauges or the like, thereby providing a direct indication of the braking force. The position of the piston may be monitored using various sensors such that the displacement of the piston may be converted into a force signal by, for example, modeling the brake system as a spring and multiplying the piston displacement by a spring constant.

Using the direct force signal may be advantageous because it is the command typically generated by the system level control software. However, the force signal typically has a high signal to noise ratio and therefore may require significant filtering, resulting in a slower response time and reduced performance. Therefore, it may be preferable to used the position signal for controlling the brake system.

Attempts have been made to determine the braking force based upon the piston position input using a static look-up table that estimates the force based upon the position input. However, such systems do not account for the dynamics within the brake unit and the inevitable wear of the components of the systems (e.g., the brake pads) and therefore may provide inaccurate results.

Accordingly, there is a need for an adaptive control system for controlling the braking force in an electric brake system based upon a piston position signal.

SUMMARY

In one aspect, a method for controlling an electric brake system having a piston moveable by an electric motor is provided and includes the steps of storing data for correlating a position of the piston to a braking force applied by the piston, estimating a braking force associated with a specific position of the piston based upon the stored data, generating a control signal based upon the estimated braking force, determining a second braking force associated with the specific position and updating the stored data based upon a difference between the estimated braking force and the second braking force In another aspect, a method for controlling an electric brake system having a piston moveable by an electric motor is provided and includes the steps of storing a look-up table in a database, the look-up table including at least two data points correlating a position of the piston to a braking force applied by the piston, determining a specific position of the piston, estimating a braking force associated with the specific position of the piston based upon the data points stored in the look-up table, generating a control signal based upon the estimated braking force, determining a second braking force associated with the specific position and updating at least one of the data points in the look-up table based upon a difference between the estimated braking force and the second braking force.

In another aspect, a control system for an electric brake system is provided and includes a piston, an electric motor operatively connected to the piston, wherein rotation of the motor is translated into advancement of the piston, a controller in communication with the motor, the controller including data values adapted to correlate a position of the piston into an associated braking force, a position sensor for monitoring the position of the piston, the position sensor being adapted to generate a position signal and communicate the position signal to the controller and a second sensor adapted to determine a second braking force value and communicate the second braking force value to the controller, wherein the controller is adapted to determine a first braking force value based upon the position signal and the stored data and generate a control signal based upon the first braking force value, and wherein the controller is adapted to update the stored data based upon a difference between the first braking force and the second braking force.

Other aspects will become apparent from the following description, the accompanying drawings and the appended claims.

DETAILED DESCRIPTION

Figure 1:
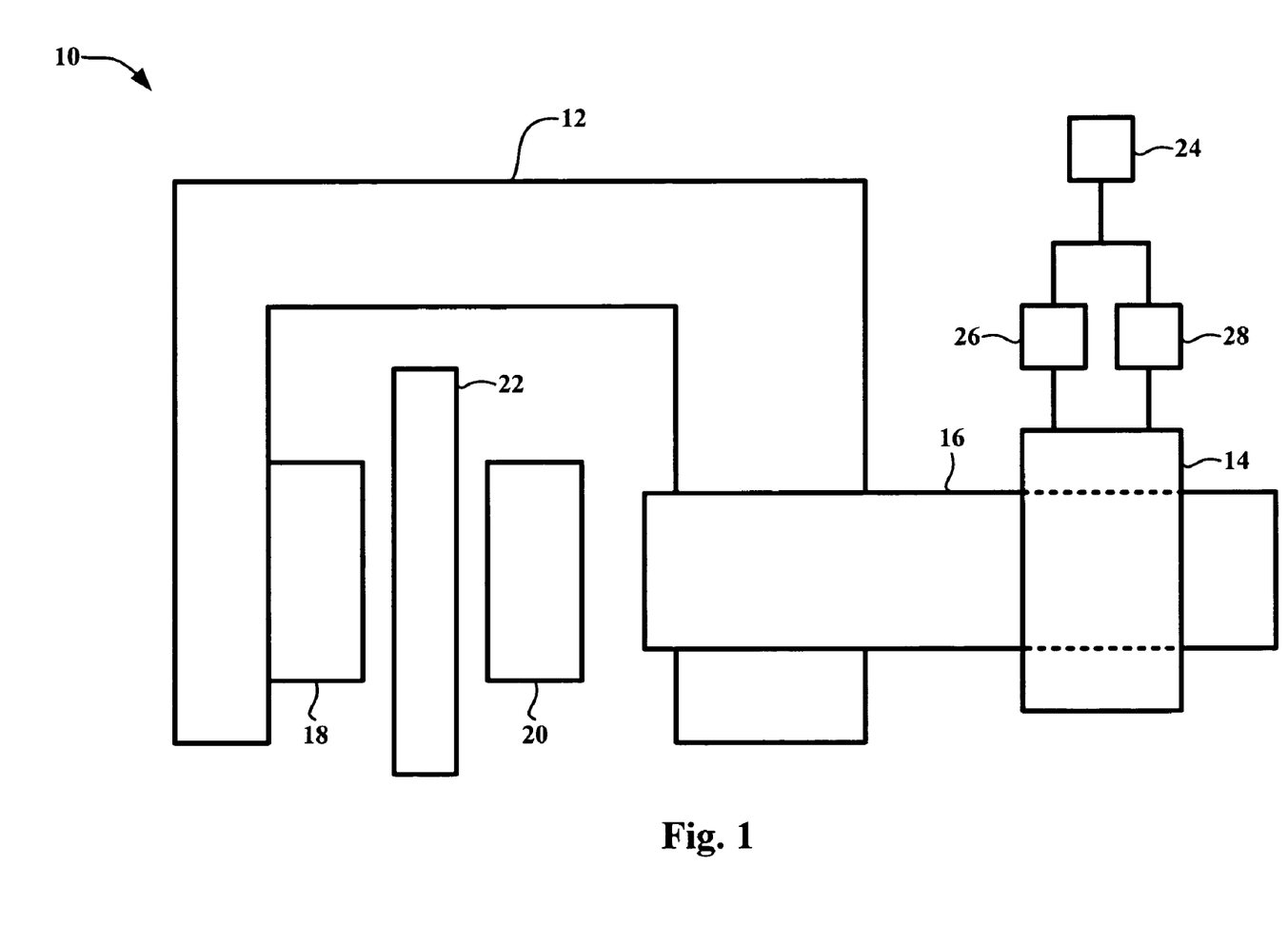
FIG. 1 is a schematic illustration of an electric brake system including an adaptive control system.

As shown in FIG. 1, an electric brake system, generally designated 10, may include a caliper housing 12, an electric motor 14, an actuator or piston 16, two brake pads 18, 20 and a rotor 22. The brake system 10 may include a ball screw assembly and a gear train (not shown) that may translate the rotational force of the motor 14 into distal advancement of the piston 16, thereby urging the piston 16 linearly into engagement with the brake pads 18, 20 to apply a braking force to the rotor 22.

Figure 2:
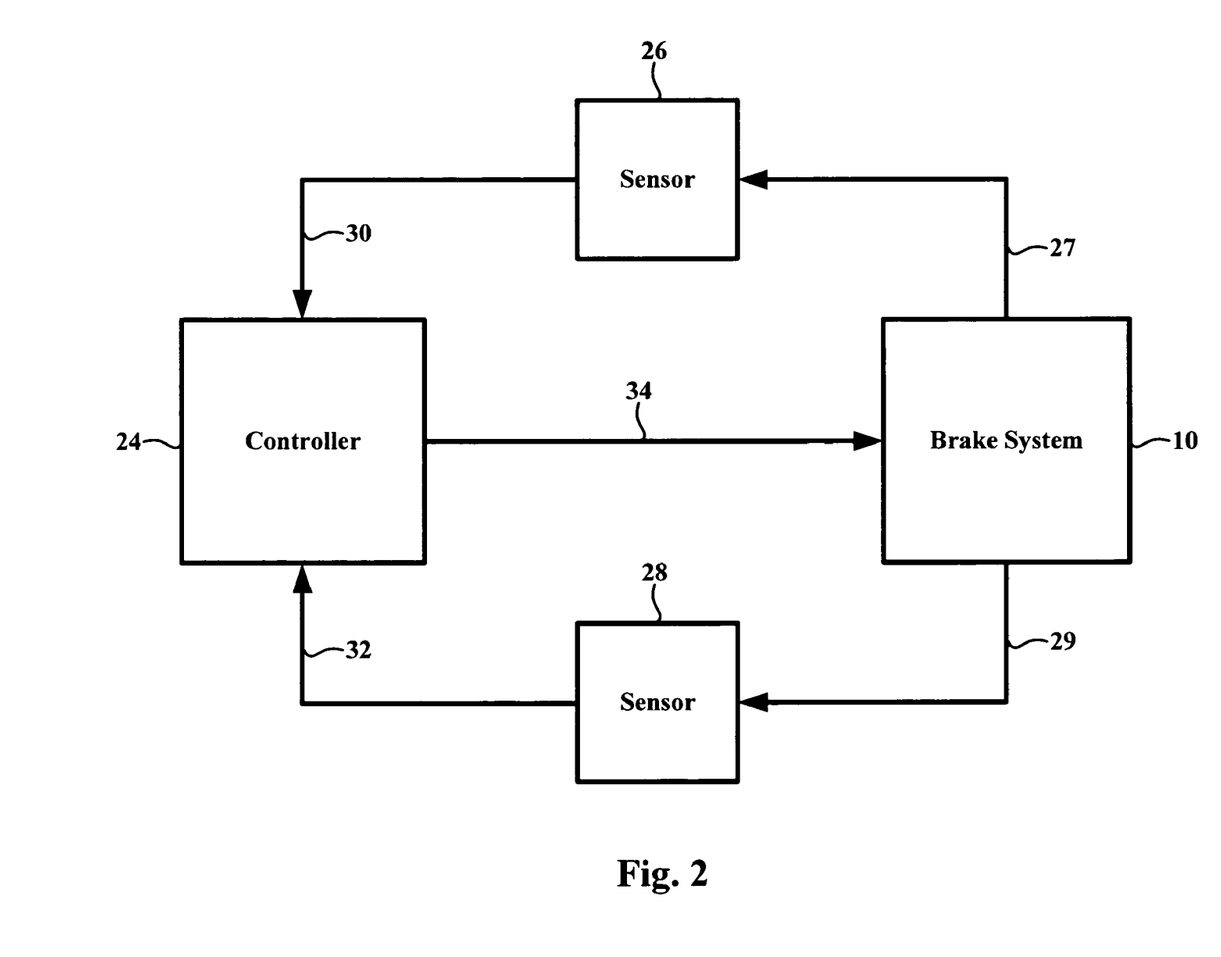
FIG. 2 is a block diagram of the electric brake system of FIG. 1.

As shown in FIGS. 1 and 2, a controller 24 may be in communication with the brake system 10 for controlling the advancement and retraction of the piston 16, thereby controlling the resulting braking force applied to the rotor 22. In one aspect, the controller 24 may include a processor (not shown), such as a computer processor, and may be in communication with a force sensor 26 and a position sensor 28.

The force sensor 26 may directly monitor the braking force applied to the rotor 22 (see line 27) and may communicate force signals to the controller 24 by, for example, communication line 30. The position sensor 28 may monitor the position of the piston 16 relative to the housing 12, the brake pads 18, 20 and/or the rotor 22 (see line 29) and may communicate position signals to the controller 24 by, for example, communication line 32.

In one aspect, the controller 24 may generate a control signal for controlling the operation of the motor 14 based upon the signals received from the sensors 26, 28 and may communicate a control signal to the brake system 10 by way of communication line 34. The control signal may be generated according to the adaptive control system described in greater detail below. The control signal may be communicated directly to the motor 14 or to any appropriate portion of the brake system 10.

Those skilled in the art will appreciate that the communication of signals and commands, as described herein, may be performed over physical communication lines (e.g., wires) or wirelessly. Furthermore, the communication of signals may be performed within a single device or between multiple devices.

Figure 3:
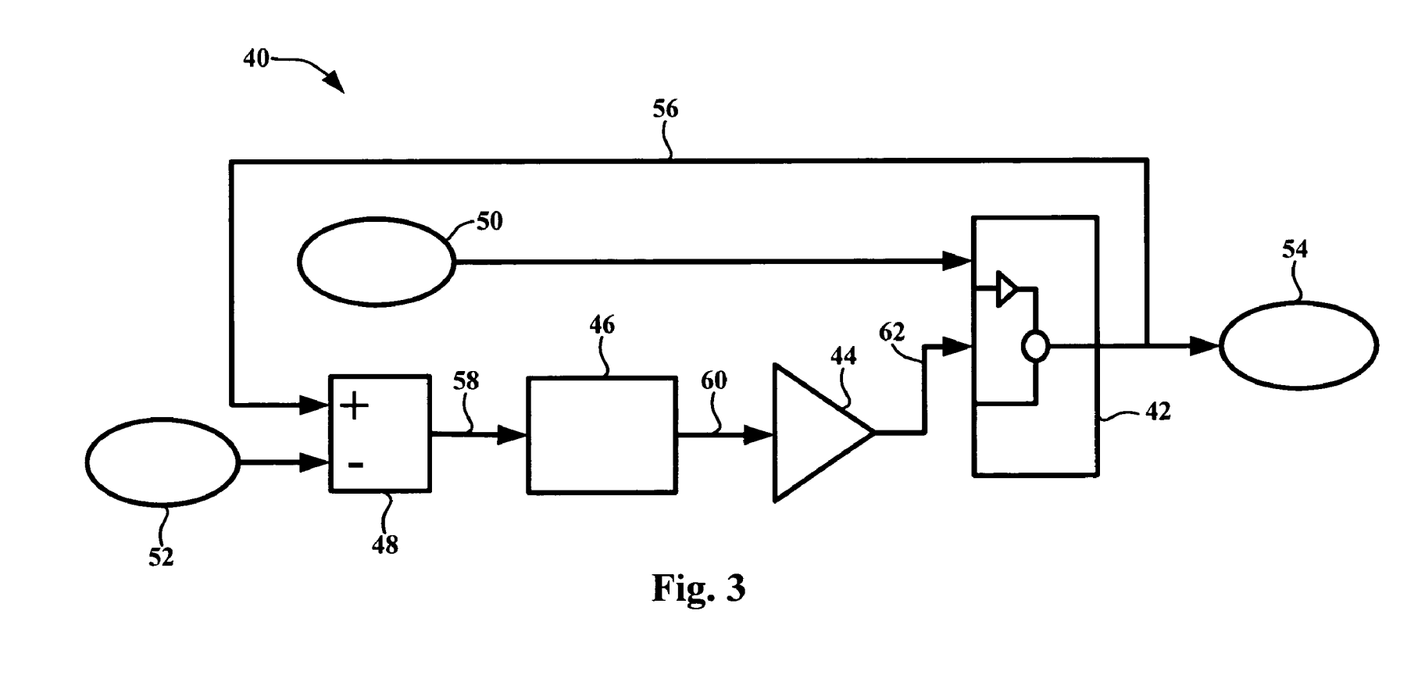
FIG. 3 is a block diagram of one aspect of the adaptive control system of FIG. 1.

As shown in FIG. 3, one aspect of the adaptive control system, generally designated 40, may include a database or adaptive table 42, an adaptation gain block 44, a robustification deadzone block 46 and a summing block 48. The system 40 additionally may include two inputs and one output: the position signal input 50, the force signal input 52 and the estimated force output 54. The estimated force output 54 may be used by the controller 24 for generating a control signal (see line 34 in FIG. 2) for controlling the brake system 10.

The adaptive table 42 may receive the position signal input 50 from the position sensor 28 and may correlate the position signal, using a look-up table, equation or the like, into the estimated force output 54. The adaptive table 42 may include a discrete number of data points such that output values may be obtained by interpolating between the data points.

The estimated force may be communicated to the summing block 48 by line 56 and the summing block 48 may determine a difference value (i.e., an error signal) between the estimated force output 54 and the force signal input 52. For example, the error signal may be generally equal to the force signal input 52 minus the estimated force output 54.

The force signal input 52 may be based upon signals received from the force sensor 26. For example, the force sensor 26 may be piezo device or the like. However, those skilled in the art will appreciate that the force signal input 52 may be based upon any available force measurement or an estimate of force, such as a high precision force estimate. For example, the force signal input 52 may be derived from measurements of the motor speed or motor current, as described in U.S. Ser. No. 11/235,392 filed on Sep. 26, 2005, the entire contents of which are incorporated herein by reference.

The output of the summing block 48 may be passed to the deadzone block 46 by line 58. The deadzone block 46 may be provided to filter error signals that are less then a predetermined minimum threshold value prior to communicating the error signals to the adaptation gain block 44 (e.g., by way of line 60) or directly to the adaptive table 42. For example, if the absolute value of the error signal is less than N, wherein N is the predetermined minimum threshold value, then the output of the deadzone block 46 may be zero, or some other value. If the absolute value of the error signal is greater than or equal to N, then the error signal may be passed along unchanged.

The system 40 may include a gain block 44 which may apply a gain G to the error signal and may communicate the modified error signal (i.e., (Error Signal)*G) to the adaptive table 42, by way of line 62, as a second input to the adaptive table 42. The gain G may be selected based upon the desired properties of the adaptive table 42. Foe example, the gain G may be selected based upon the desired speed at with the adaptive table 42 is to be updated. In one aspect, the gain G may be a numeric value less than 1, such as, for example, 0.1 or 0.2.

In one aspect, the adaptive table 42 may update the data values (or other correlating values) based upon the error signal. In another aspect, the data values may be updated based upon the modified error signal.

Accordingly, in one aspect, the data values in the adaptive table 42 may be updated each time the error signal is greater than or equal to N. Alternatively, the data values may be updated each time the error signal is not zero.

For clarity, reference will be made to the data values provided at Table 1, which includes six discrete input values (i.e., position values), see block 50, having six corresponding output values (i.e., estimated force values), see block 54:

TABLE 1

| Position Signal Input (units) | Estimated Force Output (units) |
|---|---|
| 0 | 5 |
| 0.1 | 10 |
| 0.2 | 15 |
| 0.3 | 20 |
| 0.4 | 25 |
| 0.5 | 30 |

The position values may be based upon the displacement of the piston and may have various units, such as inches, millimeters or the like. The estimated force values may be estimates of braking force that correspond to values of piston displace and may have various units, such as Newtons, dynes or the like. Furthermore, those skilled in the art will appreciate that the adaptive table 42 may have any number of data points and the data points may be scattered or organized in various ways.

Figure 4:
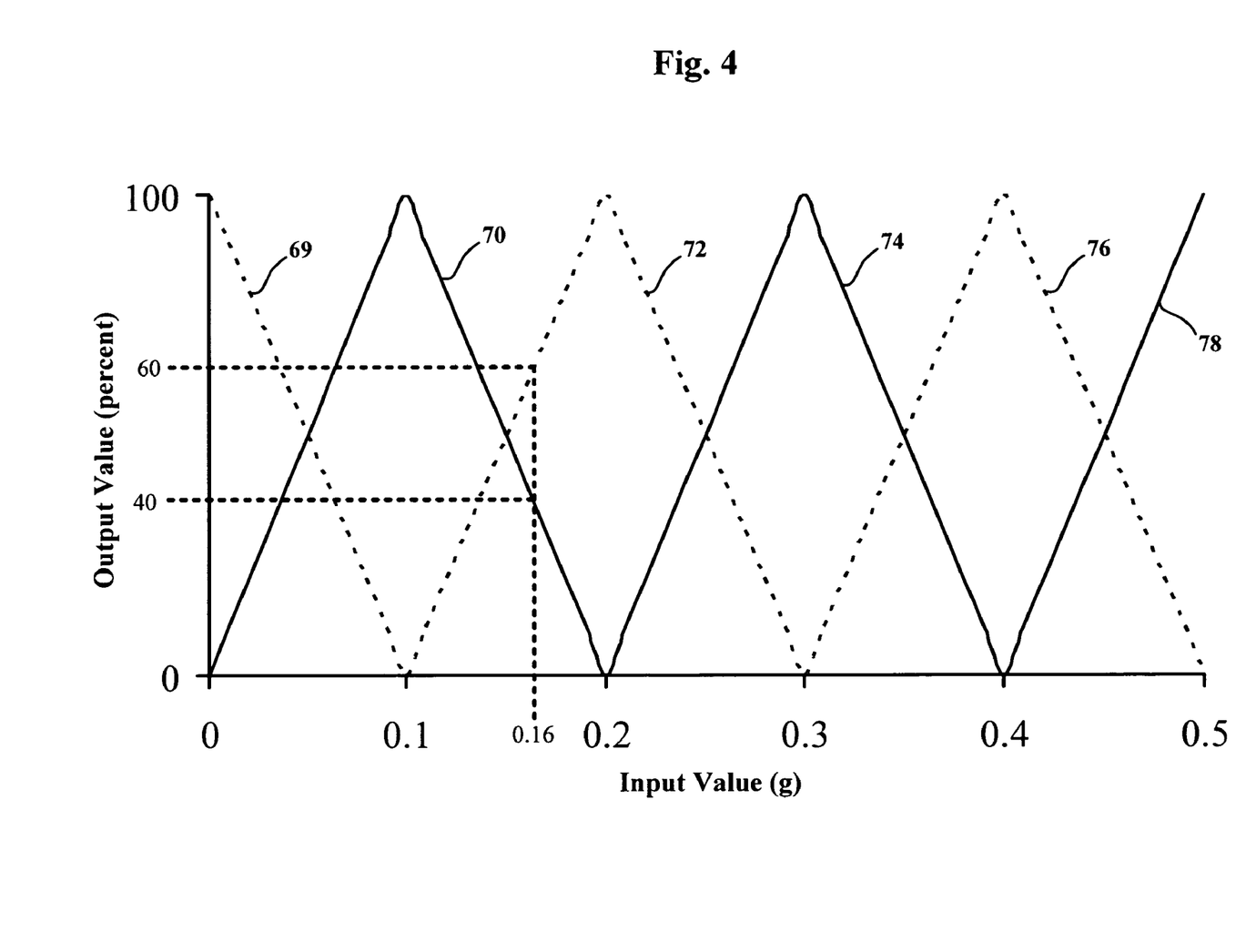
FIG. 4 is a graphical illustration of a membership function according to one aspect of the adaptive control system of FIG. 3.
Figure 5:
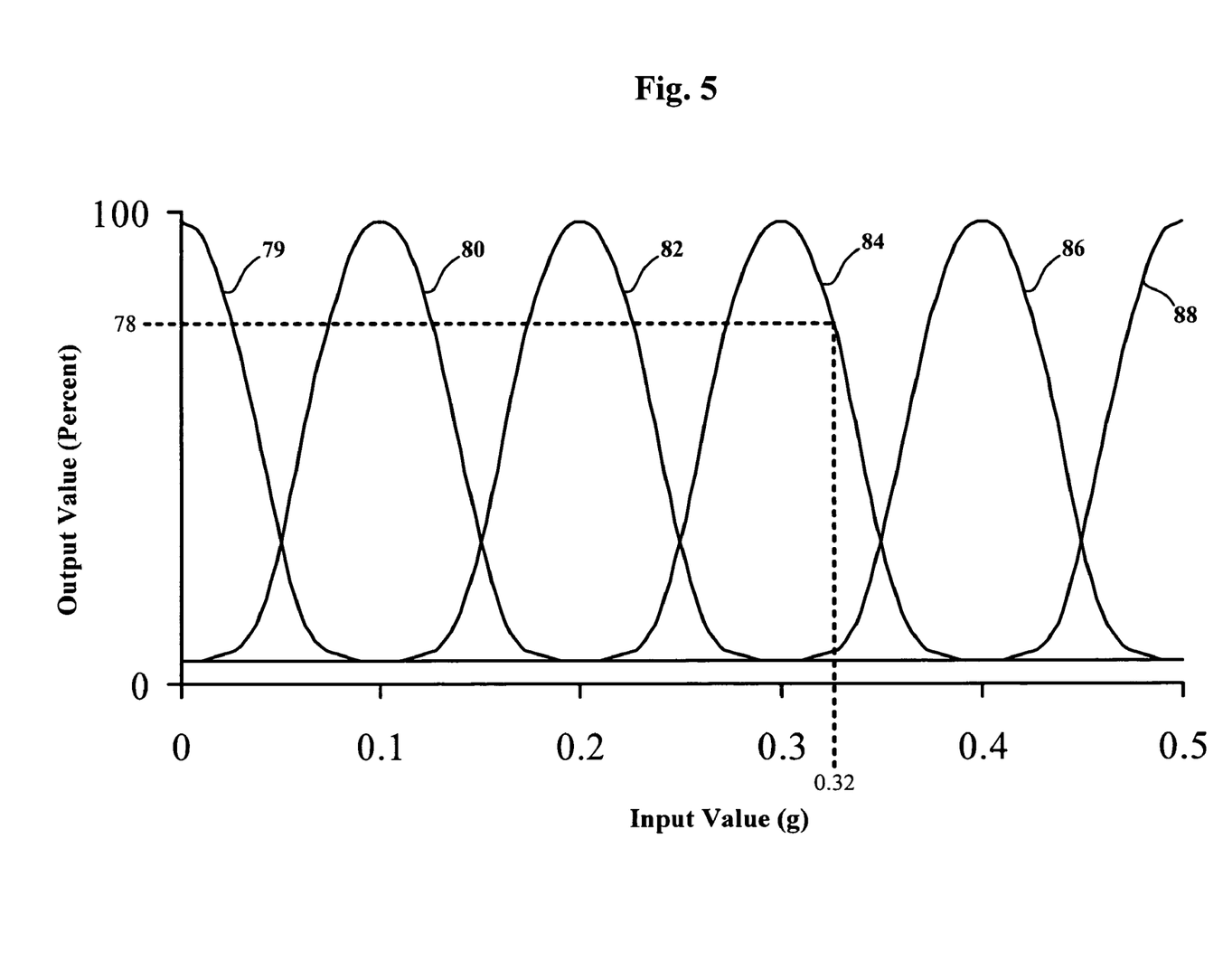
FIG. 5 is a graphical illustration of a membership function according to a second aspect of the adaptive control system of FIG. 3.

In one aspect, as shown in FIGS. 4 and 5, a plurality of membership functions (i.e., "f(input)") may be provided, wherein each membership function may correspond to a discrete input value from the adaptive table 42. The membership functions may be linear and/or finite, as shown in FIG. 4, or non-linear and/or infinite, as shown in FIG. 5. For example, functions 69, 79 may correspond to input value 0, functions 70, 80 may correspond to input value 0.1, functions 72, 82 may correspond to input value 0.2, functions 74, 84 may correspond to input value 0.3, functions 76, 86 may correspond to input value 0.4 and functions 78, 88 may correspond to input value 0.5. The membership functions may provide an indication of how each discrete data point in the adaptive table 42 is effected by the error signal.

Accordingly, in one aspect, for each non-zero signal passed from the deadzone block 46, the output values in the adaptive table 42 may be updated by multiplying the membership function for the corresponding input value by the error signal or the modified error signal and adding the product to the previous (i.e., not updated) output value, as shown by Eq. 1:

$$\text{Output(input)}' = \text{Output(input)} + f(\text{input}) * (\text{Error Signal}) * \text{Gain} \quad (\text{Eq. 1})$$

wherein Output(input) is the output value corresponding to a specific input value before the most recent update and Output(input)' is the updated output value.

Applying Eq. 1 to the six data points in Table 1, the following Eqs. 2-7 may be obtained:

$$\text{Output}(0)' = \text{Output}(0) + f(0) * (\text{Error Signal}) * \text{Gain} \quad (\text{Eq. 2})$$

$$\text{Output}(0.1)' = \text{Output}(0.1) + f(0.1) * (\text{Error Signal}) * \text{Gain} \quad (\text{Eq. 3})$$

$$\text{Output}(0.2)' = \text{Output}(0.2) + f(0.2) * (\text{Error Signal}) * \text{Gain} \quad (\text{Eq. 4})$$

$$\text{Output}(0.3)' = \text{Output}(0.3) + f(0.3) * (\text{Error Signal}) * \text{Gain} \quad (\text{Eq. 5})$$

$$\text{Output}(0.4)' = \text{Output}(0.4) + f(0.4) * (\text{Error Signal}) * \text{Gain} \quad (\text{Eq. 6})$$

$$\text{Output}(0.5)' = \text{Output}(0.5) + f(0.5) * (\text{Error Signal}) * \text{Gain} \quad (\text{Eq. 7})$$

wherein Eqs. 2-7 accurately update the discrete table values based upon interpolated values between the discrete table values and the error signal.

EXAMPLE 1

Using the data values provided at Table 1, a position input value of 0.16 may correspond to an estimated force value of about 13. In one aspect, the estimated force value may be determined using an interpolation technique between input value 0.1 and input value 0.2.

Using the membership functions provided at FIG. 4 and assuming, for example, the actual force input value is 14, the gain G is 1, and the minimum threshold value N is 0.5, the updated output values may determined as follows:

$$\text{Output}(0)' = 5 + (0\%) * (14-13) * (1) = 5$$

$$\text{Output}(0.1)' = 10 + (40\%) * (14-13) * (1) = 10.4$$

$$\text{Output}(0.2)' = 15 + (60\%) * (14-13) * (1) = 15.6$$

$$\text{Output}(0.3)' = 20 + (0\%) * (14-13) * (1) = 20$$

$$\text{Output}(0.4)' = 25 + (0\%) * (14-13) * (1) = 25$$

$$\text{Output}(0.5)' = 30 + (0\%) * (14-13) * (1) = 30$$

Figure 6:
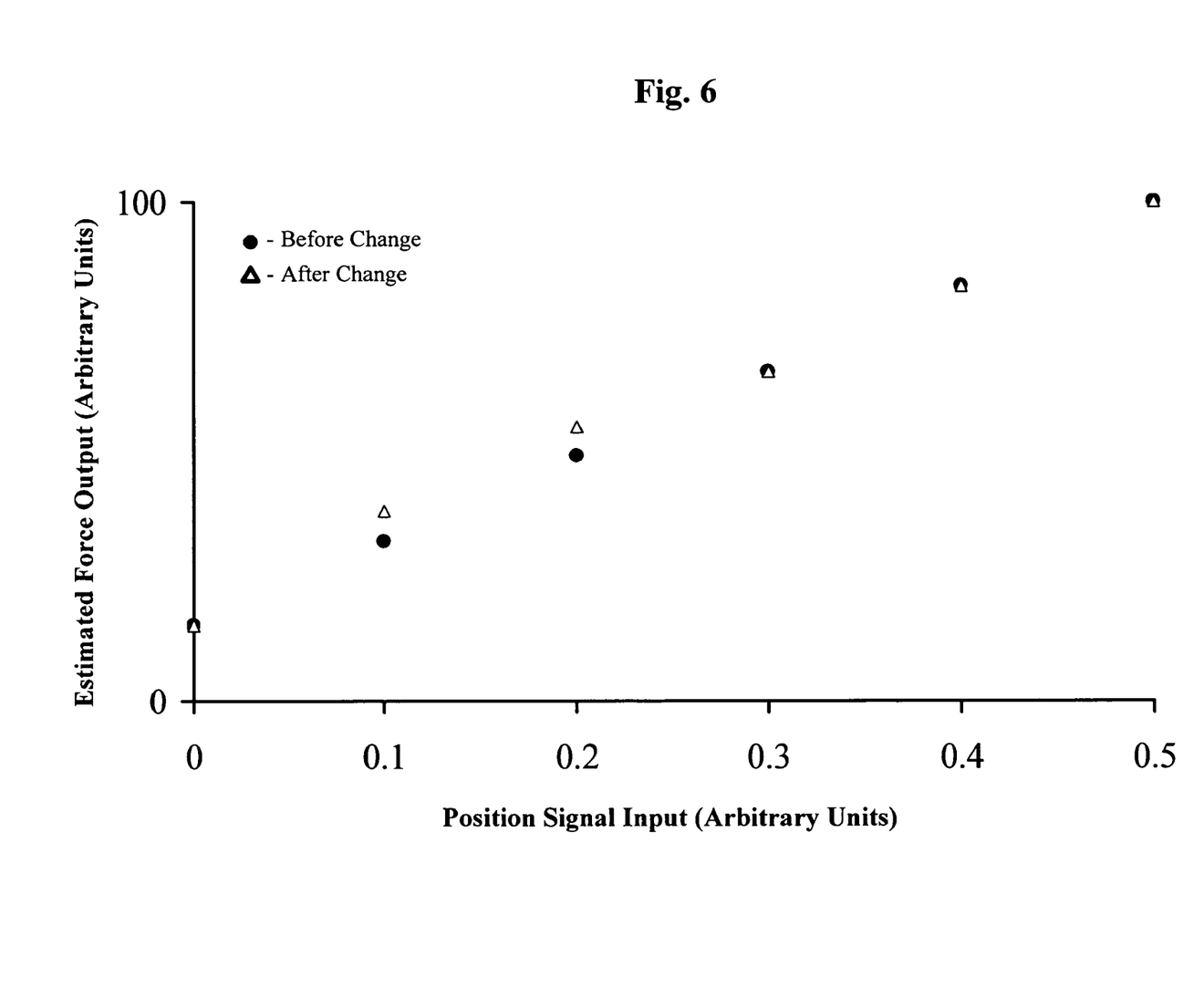
FIG. 6 is a graphical illustration of the operation of the adaptive control system of FIG. 3.

FIG. 6 provides a graphical illustration of the original data values of Table 1 plotted against the updated data values.

EXAMPLE 2

Using the data values provided at Table 1, a position input value of 0.32 may correspond to an estimated force value of about 21. In one aspect, the estimated force value may be determined using an interpolation technique between input value 0.3 and input value 0.4.

Using the membership functions provided at FIG. 5 and assuming, for example, the actual force input value is 19, the gain G is 1, and the minimum threshold value N is 0.5, the updated output values may determined as follows:

$$\text{Output}(0)' = 5 + (0.5\%) * (19-21) * (1) = 4.99$$

$$\text{Output}(0.1)' = 10 + (3.5\%) * (19-21) * (1) = 9.93$$

$$\text{Output}(0.2)' = 15 + (5\%) * (19-21) * (1) = 14.90$$

$$\text{Output}(0.3)' = 20 + (81\%) * (19-21) * (1) = 18.38$$

$$\text{Output}(0.4)' = 25 + (6\%) * (19-21) * (1) = 24.88$$

$$\text{Output}(0.5)' = 30 + (4\%) * (19-21) * (1) = 29.92$$

Accordingly, a system, method and apparatus are provided for updating a look-up table such that position signals may be converted into force signals with more accuracy, thereby improving the control of the electric brake system 10. In one aspect, the adaptive table may be updated repeatedly during a brake apply state of the brake system 10.

Although various aspects have been shown and described, modifications may occur to those skilled in the art upon reading the specification. The public is hereby placed on notice that any patent that may issue on this application includes such modifications and is limited only by the scope of the claims.

The invention claimed is:

1. A method for controlling an electric brake system having a piston moveable by an electric motor, said method comprising the steps of:
    storing data for correlating a position of said piston to a braking force applied by said piston;
    estimating a braking force associated with a specific position of said piston based upon said stored data;
    generating a control signal based upon said estimated braking force;
    determining a second braking force associated with said specific position; and
    updating said stored data based upon a difference between said estimated braking force and said second braking force.

2. The method of claim 1 wherein said data includes at least two data points.

3. The method of claim 1 wherein said data is stored in a look-up table.

4. The method of claim 1 wherein said estimating step includes interpolating between said data.

5. The method of claim 1 wherein said second braking force is determined using a force sensor.

6. The method of claim 1 wherein said second braking force is determined using a detectable motor signal.

7. The method of claim 1 wherein said updating step if performed when said difference between said estimated braking force and said second braking force is greater than a predetermined threshold value.

8. The method of claim 1 wherein said updating step if performed when said difference between said estimated braking force and said second braking force is a generally non-zero value.

9. The method of claim 1 wherein said updating step includes updating generally all of said stored data.

10. The method of claim 2 wherein said updating step includes two of said data points.

11. The method of claim 2 wherein said updating step includes multiplying said difference between said estimated braking force and said second braking force by a membership function for each of said data points.

12. The method of claim 2 wherein said updating step includes multiplying said difference between said estimated braking force and said second braking force by a gain.

13. The method of claim 1 further comprising the step of repeating said updating step after each estimating step.

14. A method for controlling an electric brake system having a piston moveable by an electric motor, said method comprising the steps of:
  storing a look-up table in a database, said look-up table including at least two data points correlating a position of said piston to a braking force applied by said piston;
  determining a specific position of said piston;
  estimating a braking force associated with said specific position of said piston based upon said data points stored in said look-up table;
  generating a control signal based upon said estimated braking force;
  determining a second braking force associated with said specific position, wherein and second braking force is determined independently of said look-up table; and
  updating at least one of said data points in said look-up table based upon a difference between said estimated braking force and said second braking force.

15. A control system for an electric brake system comprising:
  a piston;
  an electric motor operatively connected to said piston, wherein rotation of said motor is translated into advancement of said piston;
  a controller in communication with said motor, said controller including data values adapted to correlate a position of said piston into an associated braking force;
  a position sensor for monitoring said position of said piston, said position sensor being adapted to generate a position signal and communicate said position signal to said controller; and
  a second sensor adapted to determine a second braking force value and communicate said second braking force value to said controller,
  wherein said controller is adapted to determine a first braking force value based upon said position signal and said stored data and generate a control signal based upon said first braking force value, and wherein said controller is adapted to update said stored data based upon a difference between said first braking force and said second braking force.

16. The control system of claim 15 wherein said data values are stored in a look-up table.

17. The control system of claim 15 wherein said second sensor is a force sensor.

18. The control system of claim 15 wherein said second sensor is adapted to monitor a detectable motor signal and determines a second braking force based upon said detectable motor signal.

19. The control system of claim 15 wherein said controller communicates said control signal to said motor.

20. The control system of claim 15 wherein said motor is controlled based upon said first braking force value.

* * * * *